(12) United States Patent
Murthy et al.

(10) Patent No.: US 8,762,410 B2
(45) Date of Patent: Jun. 24, 2014

(54) DOCUMENT LEVEL INDEXES FOR EFFICIENT PROCESSING IN MULTIPLE TIERS OF A COMPUTER SYSTEM

(75) Inventors: Ravi Murthy, Fremont, CA (US); Sivasankaran Chandrasekar, Palo Alto, CA (US); Eric Sedlar, San Francisco, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1245 days.

(21) Appl. No.: 11/184,301

(22) Filed: Jul. 18, 2005

(65) Prior Publication Data

US 2007/0016604 A1  Jan. 18, 2007

(51) Int. Cl.
*G06F 7/00* (2006.01)
(52) U.S. Cl.
USPC .......................................... 707/778
(58) Field of Classification Search
USPC ............................. 707/3, 102, 778
See application file for complete search history.

(56) References Cited

U.S. PATENT DOCUMENTS

| | | | |
|---|---|---|---|
| 5,643,633 A | 7/1997 | Telford et al. | |
| 5,870,590 A | 2/1999 | Kita et al. | |
| 5,974,407 A | 10/1999 | Sacks ................................ | 707/2 |
| 6,085,198 A * | 7/2000 | Skinner et al. ............ | 707/103 R |
| 6,330,573 B1 | 12/2001 | Salisbury et al. | |
| 6,427,123 B1 | 7/2002 | Sedlar | |
| 6,519,597 B1 | 2/2003 | Cheng et al. | |
| 6,547,829 B1 | 4/2003 | Meyerzon et al. | |
| 6,584,459 B1 | 6/2003 | Chang et al. | |
| 6,643,633 B2 | 11/2003 | Chau et al. | |
| 6,697,805 B1 | 2/2004 | Choquier et al. | |
| 6,983,322 B1 | 1/2006 | Tripp et al. | |
| 7,031,956 B1 | 4/2006 | Lee et al. | |
| 7,096,224 B2 | 8/2006 | Murthy et al. | |
| 7,139,746 B2 | 11/2006 | Shin et al. | |
| 7,139,747 B1 | 11/2006 | Najork | |
| 7,162,485 B2 | 1/2007 | Gottlob et al. | |
| 7,171,404 B2 | 1/2007 | Lindblad et al. | |
| 7,171,407 B2 | 1/2007 | Barton et al. | |
| 7,174,328 B2 | 2/2007 | Stanoi et al. | |
| 7,216,127 B2 | 5/2007 | Auerbach | |

(Continued)

FOREIGN PATENT DOCUMENTS

WO WO 01/42881 A2 6/2001
WO WO 03/027908 A2 4/2003

OTHER PUBLICATIONS

MacKenzie, David et al., "Finding Files", GNU Findutils Version 4.1.2, Nov. 1994, 38 pages.

(Continued)

*Primary Examiner* — Truong Vo
(74) *Attorney, Agent, or Firm* — Hickman Palermo Truong Becker Bingham Wong LLP (57) ABSTRACT

To improve performance of performing XML operations on an XML document in by a client tier, the client generates an index that indexes the nodes of an XML document. The index may be generated, for example, by and during parsing of the XML document. The index contains similar structures to those maintained by a database server to perform XML operations on collections of XML documents. In lieu of parsing XML document to generate an index, the client may generate indexes based on data retrieved from the indexes at the database server.

6 Claims, 8 Drawing Sheets

(56) References Cited

U.S. PATENT DOCUMENTS

| | | |
|---|---|---|
| 7,269,601 B2 | 9/2007 | Kinno et al. |
| 7,475,061 B2 | 1/2009 | Bargeron et al. |
| 7,505,985 B2 | 3/2009 | Kilroy |
| 2001/0049675 A1 | 12/2001 | Mandler et al. |
| 2002/0073019 A1 | 6/2002 | Deaton |
| 2002/0078068 A1 | 6/2002 | Krishnaprasad et al. |
| 2002/0116371 A1* | 8/2002 | Dodds et al. ............... 707/3 |
| 2002/0116457 A1 | 8/2002 | Eshleman et al. |
| 2002/0143755 A1 | 10/2002 | Wynblatt et al. |
| 2002/0152267 A1 | 10/2002 | Lennon |
| 2002/0188613 A1 | 12/2002 | Chakraborty et al. |
| 2003/0131051 A1 | 7/2003 | Lection et al. |
| 2003/0140111 A1* | 7/2003 | Pace et al. ............... 709/214 |
| 2003/0177341 A1 | 9/2003 | Devillers |
| 2003/0182461 A1* | 9/2003 | Stelting et al. ............... 709/310 |
| 2003/0212662 A1 | 11/2003 | Shin et al. |
| 2003/0212664 A1 | 11/2003 | Breining et al. |
| 2004/0010752 A1 | 1/2004 | Chan et al. ............... 715/513 |
| 2004/0044659 A1 | 3/2004 | Judd et al. |
| 2004/0083209 A1 | 4/2004 | Shin |
| 2004/0088320 A1 | 5/2004 | Perry |
| 2004/0103105 A1 | 5/2004 | Lindblad et al. |
| 2004/0111396 A1* | 6/2004 | Musayev et al. ............... 707/3 |
| 2004/0148278 A1 | 7/2004 | Milo et al. |
| 2004/0167864 A1 | 8/2004 | Wang et al. |
| 2004/0205551 A1 | 10/2004 | Santos |
| 2004/0210573 A1 | 10/2004 | Abe et al. |
| 2004/0267760 A1 | 12/2004 | Brundage et al. |
| 2005/0038688 A1 | 2/2005 | Collins et al. |
| 2005/0050016 A1 | 3/2005 | Stanoi et al. |
| 2005/0055343 A1 | 3/2005 | Krishnamurthy |
| 2005/0091188 A1* | 4/2005 | Pal et al. ............... 707/1 |
| 2005/0097084 A1* | 5/2005 | Balmin et al. ............... 707/3 |
| 2005/0108630 A1 | 5/2005 | Wasson et al. |
| 2005/0120031 A1 | 6/2005 | Ishii |
| 2005/0228792 A1* | 10/2005 | Chandrasekaran et al. ...... 707/9 |
| 2005/0228818 A1 | 10/2005 | Murthy et al. |
| 2005/0229158 A1 | 10/2005 | Thusoo et al. |
| 2005/0257201 A1 | 11/2005 | Rose et al. |
| 2005/0289125 A1 | 12/2005 | Liu et al. |
| 2005/0289138 A1* | 12/2005 | Cheng et al. ............... 707/5 |
| 2006/0053122 A1* | 3/2006 | Korn et al. ............... 707/100 |
| 2006/0064432 A1* | 3/2006 | Pettovello ............... 707/103 X |
| 2006/0195420 A1 | 8/2006 | Kilroy |
| 2006/0195421 A1 | 8/2006 | Kilroy |
| 2006/0195427 A1 | 8/2006 | Kilroy |
| 2007/0250480 A1 | 10/2007 | Najork |
| 2009/0222450 A1 | 9/2009 | Zigelman |

OTHER PUBLICATIONS

European Patent Office, "Communication Pursuant to Article 96(2) EPC," EP App. No. 02799692.5, dated Jan. 18, 2006, 5 pages.

Current Claims PCT/US02/31168, EP App. No. 02799692.5, 8 pages.

International Searching Authority, "Notification of Transmittal of the International Search Report and the Written Opinion of the International Searching Authority, or the Declaration," PCT/US2005/011763, dated Aug. 6, 2005, 12 pages.

Current Claims, PCT/US2005/011763, 4 pages.

Cooper, Brian F. et al., "A Fast Index for Semistructured Data ," Proceeding of the International Conference on Very Large Databases, 2001, XP-002303292, pp. 341-350.

McHugh, Jason, et al. "Indexing Semistructured Data," Stanford Science Department, 1998, XP-002248313, pp. 1-21.

McHugh, Jason, et al., "Query Optimization for XML," Proceeding of the 25$^{th}$ VLDB Conference, Edinburgh, Scotland, 1999, XP-002333353, pp. 315-326.

Claims, Foreign Application No. 200580018627.9 3 pages.

State Intellectual Property Office of P.R.C., "Notification of the First Office Action", Foreign Application No. 200580018627.9 mailed Oct. 12, 2007, 9 pages.

MacKenzie et al., "Finding Files" Utils, Version 4.1.2, Source Code, GNU.org, Nov. 31, 1994, source files, code.c; 3 pages.

Cormen et al., "Introduction to Algorithms", MIT Press, 2$^{nd}$ Edition, 2001, 4 pages.

Girardot et al., "Millau: an encoding format for efficient representation and exchange of XML over the Web", IBM Almaden Research Center, 24 pages.

Shankar Pal et al., "Indexing XML Data Stored in a Relational Database", Proceedings of the 30$^{th}$ VLDB Conference, 2004, 12 pages.

MacKenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, 2$^{nd}$ Edition, 4 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages.

Claims, European patent application 05732473.3-1225, 3 pages.

* cited by examiner

DOCUMENT LEVEL INDEXES FOR EFFICIENT PROCESSING IN MULTIPLE TIERS OF A COMPUTER SYSTEM

RELATED APPLICATION

This application is related to U.S. application Ser. No. 10/884,311, entitled Index For Accessing XML Data, filed on Jul. 2, 2004 by Sivasankaran Chandrasekara et al., the contents of which are herein incorporated by reference in their entirety for all purposes.

FIELD OF THE INVENTION

The present invention relates to processing XML data, and in particular, processing XML related operations on XML data.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this, section qualify as prior art merely by virtue of their inclusion in this section.

The Extensible Markup Language (XML) is the standard for data and documents that is finding wide acceptance in the computer industry. XML describes and provides structure to a body of data, such as a file or data packet. The XML standard provides for tags that delimit sections of an XML entity referred to as XML elements. The following XML document A is provided to illustrate XML.

| XML document A |
|---|
| <a c="foo"> |
| <b>5</b> |
| <d>10</d> |
| </a> |

XML elements are delimited by a start tag and a corresponding end tag. For example, segment A contains the start tag <b> and the end tag </b> to delimit an element. The data between the elements is referred to as the element's content.

An element has a name and is referred to herein by its name. The name of the element delimited by the open tag <b> and the end tag </b> is b and is thus referred to herein as element b or just b.

An element's content may include the elements value, one or more attributes and/or one or more elements. Element a contains two elements b and d. An element that is contained by another element is referred to as a descendant of that element. Thus, elements b and d are descendants of element a. An element's attributes are also referred to as being contained by the element.

An attribute is a name value pair. Element a has attribute c, which has the value 'foo'.

Element b has the value 5 and element d has the value 10. Element a does not have a value.

By defining elements that contain attributes and descendant elements, an XML document defines a hierarchical tree relationship between the elements, descendant elements, and attributes of the elements.

Node Tree Model

An important standard for XML is the XQuery 1.0 and XPath 2.0 Data Model. (see W3C Working Draft 9 Jul. 2004, which is incorporated herein by reference) One aspect of this model is that an XML document is represented by a hierarchy of nodes that reflects the XML document's hierarchical nature.

A hierarchy of nodes is composed of nodes at multiple levels. The nodes at each level are each linked to one or more nodes at a different level. Each node at a level below the top level is a child node of one or more of the parent nodes at the level above. Nodes at the same level are sibling nodes.

In a tree hierarchy or node tree, each child node has only one parent node, but a parent node may have multiple child nodes. In a tree hierarchy, the node that has no parent node linked to it is the root node, and a node that has no child nodes linked to it is a leaf node. A tree hierarchy has a single root node. In a node tree that represents an XML document, a node can correspond to an element, and the child nodes of the node correspond to an attribute or another element contained in the element.

For convenience of expression, an element and attribute of an XML document are referred to as the node that corresponds to that element or attribute within the node tree that represents the XML document. Thus, referring to 5 as the value of node b is just a convenient way of expressing that the value of the element b is 5.

The nodes of an XML document descend from the same root node. An XML document may contain subtrees of nodes that descend from a non-root node. The subtree may also be referred to herein as an XML document or as a fragment of the XML document that contains the subtree.

Xml Storage Mechanisms

Various types of storage mechanisms are used to store an XML document. One type of storage mechanism stores an XML document as a text file in a file system.

Another type of mechanism for storing XML documents is a database server. In a database server, an XML document may be stored in a row of a table and nodes of the XML document are stored in separate columns in the row. An entire XML document may also be stored in a LOB (large object) in a column. An XML document may also be stored as a hierarchy of objects in a database; each object is an instance of an object class and stores one or more elements of an XML document. The object class defines, for example, the structure corresponding to an element, and includes references or pointers to objects representing the immediate descendants of the element. Tables and/or objects of a database system that hold XML values are referred to herein as base tables or objects.

Multi-tier Architectures and Terminology

Computer systems that process XML documents usually follow a multi-tier model in which a "source tier" supplies either all or portions of XML documents and one or more other tiers directly or indirectly interact with the source tier to retrieve all or part of the one or more XML documents.

Computer systems that use database servers to store XML documents are typically implemented in a multi-tier architecture that has a database server in the source tier ("database tier") and one or more outer tiers that interact, directly or indirectly, with the database tier. When a tier interacts indirectly with a source tier, the tier acts through one or more middle tiers. Any entity within a tier that interacts directly or indirectly with the source tier is referred to as a client with respect to the source tier. Any outer tier is referred to herein as a client tier.

For example, an application server in the middle tier may interact with a database server in a database tier. The application server is a client of a database server and is in the client tier. A browser process on another computer connected to the application server's computer may indirectly retrieve part of an XML document from the database server by requesting and retrieving it from the application server. The browser process is in a client tier different than the tier of the application server and is also a client of the database tier and database server.

Typically, but not always, interaction between a client tier and the source tier involves interaction between different processes and computers in the respective tiers. The process in the client tier may be executing on a computer in the client tier that is interconnected via a network to another computer in the source tier. The tiers usually interact via an application program interface, which typically involves inter-process remote procedure calls between tiers.

XML Operations Supported By Database Server

Database servers that store XML documents may be enhanced to efficiently perform XML operations. One type of operation is to execute queries over collections of XML documents using XML query languages, such as XQuery/XPath. XML Query Language ("XQuery") and XML Path Language ("XPath") are important standards for a query language, which can be used in conjunction with SQL to express a large variety of useful queries. XPath is described in *XML Path Language (Xpath)*, version 1.0 (W3C Recommendation 16 Nov. 1999), which is incorporated herein by reference.

For various reasons, XML operations are performed outside the database tier in the client tier. An example of one such reason is to shift workload from the database tier to the client tier. However, XML operations in the client tier may not be performed as efficiently as XML operations performed in the database tier by a database server that has been enhanced to perform XML operations. Thus, client tier execution of XML operations suffers from performance degradation.

Based on the foregoing, there is a clear need to develop approaches that improve the efficiency of XML operations performed in the client tier.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for indexing XML documents is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

To improve performance of performing XML operations in the client tier on an XML document, the client tier generates an index that indexes the nodes of the XML document. The index may be generated, for example, by and during parsing of the XML document. The index may contain similar structures to those maintained by a database server to perform XML operations on collections of XML documents. In lieu of parsing an XML document to generate an index, the client tier may generate indexes based on data retrieved from the indexes at the database server.

Figure 1:
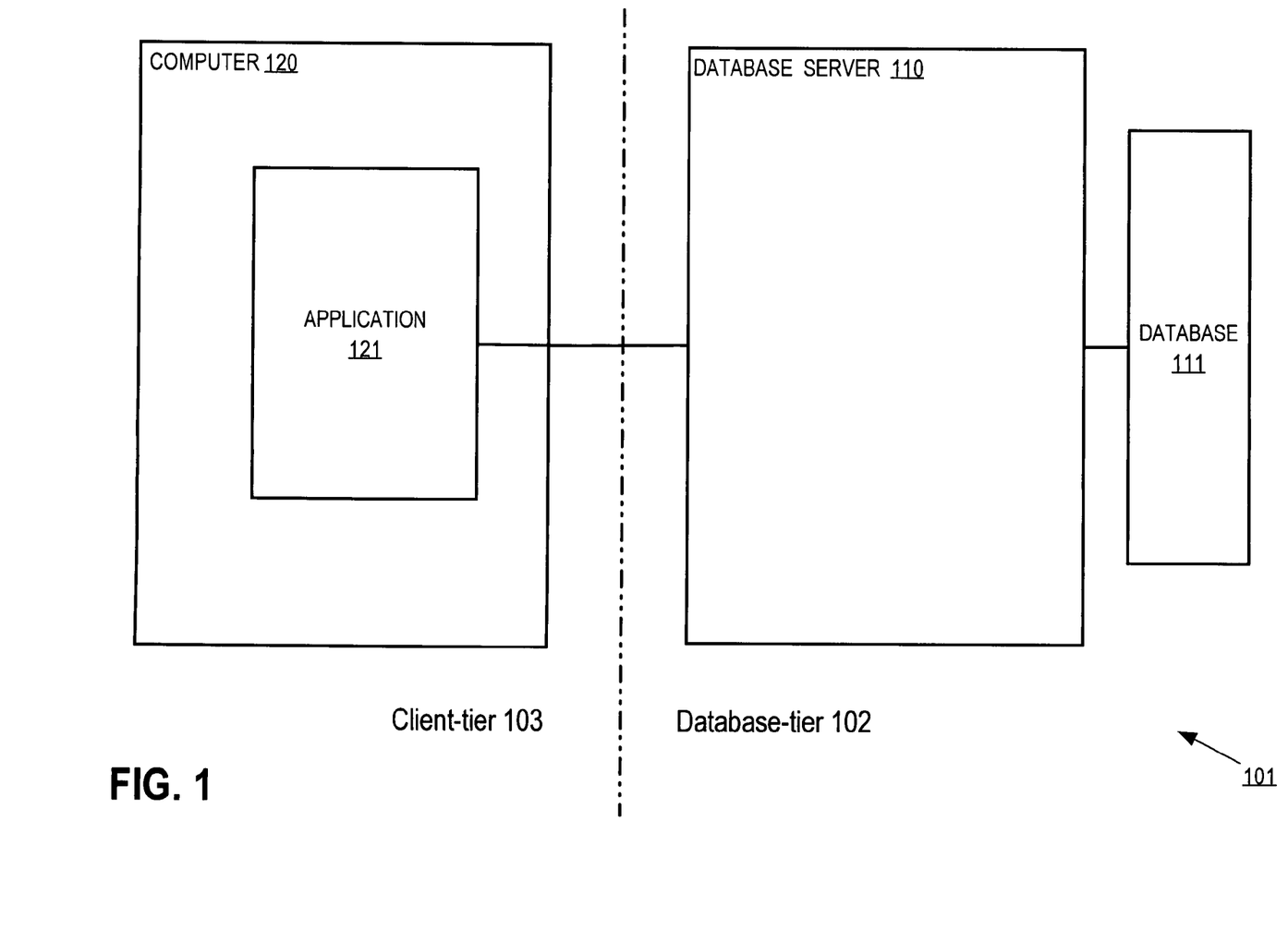
FIG. 1 is a block diagram of a multi-tier architecture used in an embodiment of the present invention.

FIG. 1 depicts multi-tier architecture 101, which includes a database tier 102 and a client tier 103. The database tier includes database server 110. A server, such as database server 110, is a combination of integrated software components and an allocation of computational resources, such as memory, one or more computers, and processes on the one or more computers that execute the integrated software components on a processor, the combination of the software and computational resources being dedicated to performing a particular function on behalf of one or more clients.

A database server governs and facilitates access to a particular database, processing requests by clients to access the database. Database server 110 governs access to database 111.

The client tier of architecture 101 includes application 121 being executed by a client process on computer 120. An application, as the term is used herein, is a unit of software that is configured to interact with and use the functions of a server. In general, applications are comprised of integrated functions and software modules (e.g. programs comprised of machine executable code or interpretable code, dynamically linked libraries) that perform a set of related functions.

In an alternate embodiment, the client tier 103 may include multiple tiers. For example, application 121 may be an application server that interacts with a browser on a user computer connected to computer 120 over a private or public network, such as the internet.

Logical Indexes for Efficient Access

Database server 110 stores a collection XML documents in database 111. An entire XML document may be stored in a LOB in a column of a row of a "base table". Alternatively, each XML document in the collection may be stored in a row of a base table and each node of the XML document is stored in a separate column in a row of the base table. More than one base table may be used to store an XML document. Finally, an XML document may also be stored as a hierarchy of objects in database 111.

To facilitate access to a collection of XML documents, a database server maintains a logical index that indexes the collection of XML documents. A logical index contains multiple structures that are cooperatively used to access another body of data, such as a collection of XML documents. According to an embodiment of the present invention, a logical index includes a path table, which contains information about the hierarchy of nodes in a collection of XML documents and may contain the value of the nodes. The logical index also includes other indexes, including ordered indexes. An ordered index contains entries that have been ordered based on an index key. An index key is a set of values ("key values") on which an order is based. An example of an ordered index is a b-tree index or a bitmap index. An example of index key is a column in a table. An ordered index may have more than one index key.

Figure 2A:
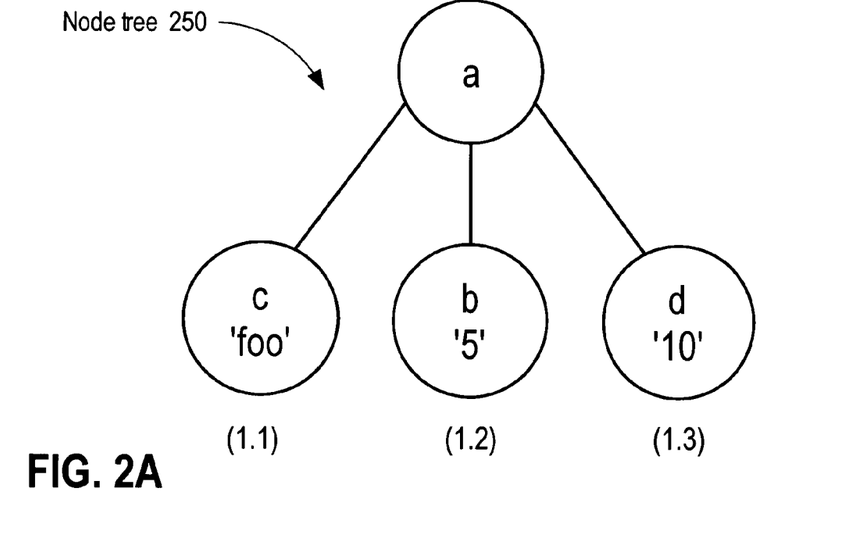
FIG. 2A is a node-tree representation of an XML document according to an embodiment of the present invention.
Figure 2B:
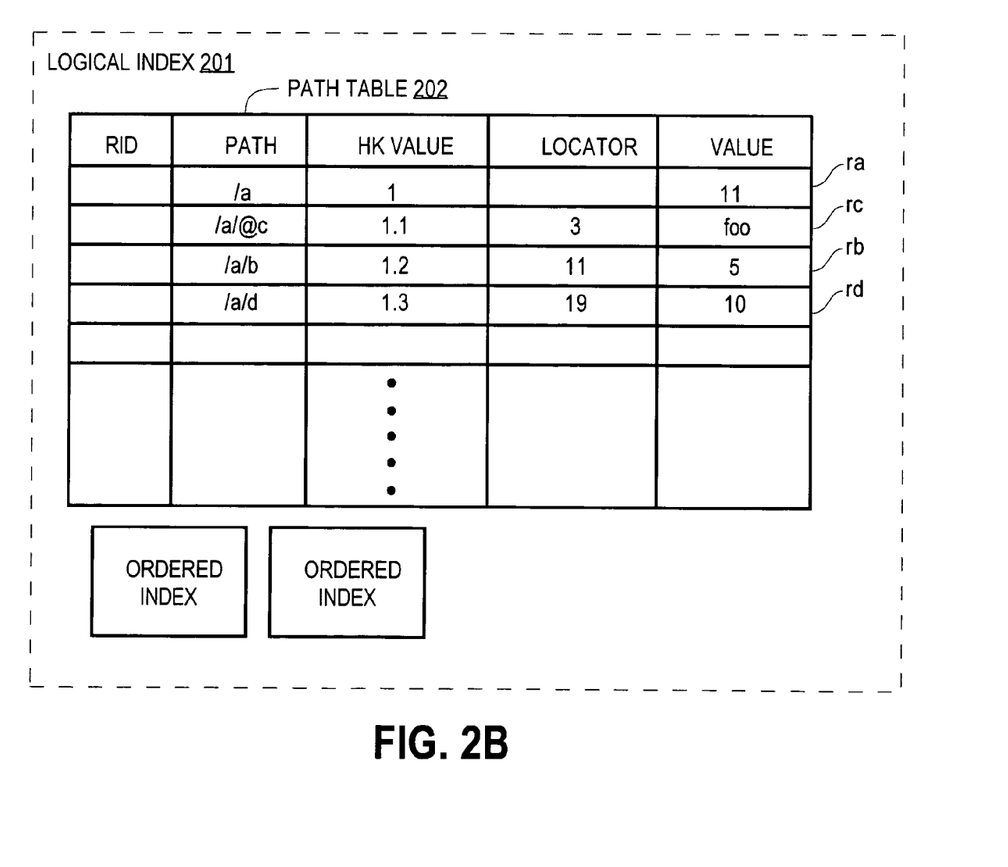
FIG. 2B is a logical index for a collection of XML documents according to an embodiment of the present invention.

FIG. 2B shows path table 202 maintained by database server 110, a path table according to an embodiment of the present invention. A path table contains hierarchical information about a collection of a set of XML documents. Path table 202 is illustrated with reference to node tree 250 (shown in FIG. 2A), a node tree representation of XML document A.

Path table 202 includes columns RID, PATHID, HK VALUE, LOCATOR, and VALUE. Each row in path table 202 corresponds to a node within node tree 250. Rows ra, rb, rc and rd correspond to nodes a, b, c and d, respectively.

Column HK VALUE holds hierarchy-order key values, which are values that identify a node's hierarchical level within a node tree representing an XML document and that identify the order of the node among the nodes at the same hierarchical level.

Column PATHID holds pathids. A pathid is a path expression that represents the "path" within an XML document from a node to another node. The "path" for a node in an XML document reflects a series of parent-child links, starting from a node in an XML document to arrive at a particular node further down in the hierarchy. For example, the path from the root of XML document A to node d is '/a/d'. The path to node c is '/a/@c', the @ indicating, according to XPath, that c is attribute of a.

Path expressions are typically strings representing a concatenation of names of nodes in a path. However, the names of nodes can be very long. To reduce the length of a path expression, and lessen the amount of storage needed to store the path expression, pathids may be used in lieu of name-based path expressions.

A pathid is comprised of node-id codes that are used in lieu of node names. In a pathid, there is a node-id code for each corresponding node name of a name-based path expression. For example, node-id codes 32, 12, and 23 are assigned to nodes root, a and b. The path expression based on node-id codes for the path '/a/b' is thus '32/12/23'. For purposes of exposition, pathids are represented, hereafter and in the figures, as their corresponding name based path expression.

Column ORDER KEY holds hierarchy-order key values, which are values that identify a node's hierarchical level within a node tree representing an XML document and that identify the order of the node among the nodes at the same hierarchical level.

According to an embodiment, the hierarchy-order key values are Dewey-like values, where the hierarchy-order key value of a given node is created by appending a value to the end of the hierarchy-order key value of the immediate parent node, if any, where the appended value indicates the position, among the children of the parent node, of the given node. The root node, having no parent, has a pre-established value, such as 1.

For example, root node a, having no parent, has the value 1 in column HK VALUE of row ra. Nodes c, b, and d are on the same next level below their parent node a. Node c, being the first sibling node at this level, has the hierarchy-order key value of '1.1'. Node d, being the third sibling node at this level, has the hierarchy-order key value of '1.3'.

Column LOCATOR contains node locators, which are values indicating the location of a node within a data representation of an XML document. For example, for a stream of text representing an XML document, a node locator may be a value that represents the beginning byte position, within the stream of text, of the text representing the node. As another example, a set of hierarchically related in-memory data structures may represent the nodes of an XML document. A node locator may be a pointer to the in-memory structure that represents the node.

Column VALUE contains the values of nodes. Alternatively, a path table may omit a column that holds values of nodes. The values could be obtained by retrieving them from the location identified by a node locator.

Client Generation of Logical Indexes

A logical index maintained by database server 110 is a mechanism used by database server 110 to optimize the execution of XML operations. To allow XML operations to be performed by the client tier more efficiently, logical indexes that index just one XML document are generated within the client tier. Such indexes are referred to herein as single-scope indexes. Single-scope indexes allow the client tier to efficiently perform XML operations, such as XPath query operations.

The procedure is illustrated with reference to XML document A and architecture 101. Architecture 101 has, as a source tier, database tier 102. The present invention, however, is not limited to a context in which the source tier is a database tier. For example, the source tier and client tier may comprise the interconnected computer systems of trading partners electronically communicating XML documents. The source tier may be the computer system of one trading partner sending the order document and the client tier may be the other trading partner's computer system, which processes the order document. The XML document may be communicated over a public network, such as the Internet.

Figure 3:
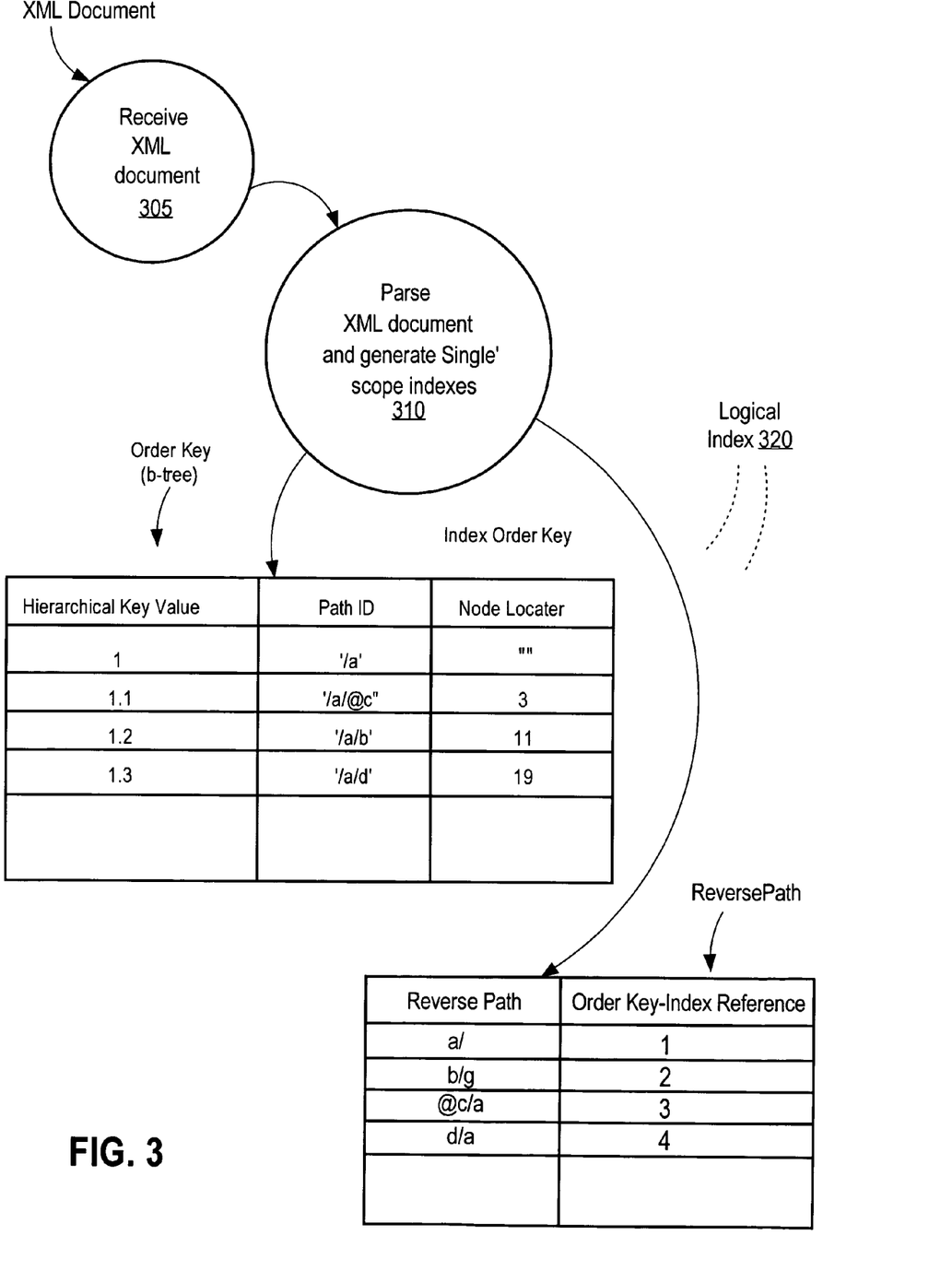
FIG. 3 is a single-scope index and a procedure for generating a logical index in the client tier according to an embodiment of the present invention.

FIG. 3 is a block diagram depicting single-scope indexes and a procedure for generating single-scope indexes according to an embodiment of the present invention. Referring to FIG. 3, client tier 103 receives a "source XML document" from the database tier. The source XML document is received and stored as a stream of text. For purposes of illustration, XML document A is received as the source document.

At step 310, XML document A is parsed. While the XML document is being parsed, logical index 320 is generated. Logical index 320 includes index OrderKey and index ReversePath, which index XML document A.

Index OrderKey contains an index entry for each node in source XML document A. Each entry for a node includes a hierarchy-key value for the node, pathid for the node, and a node locator. The index key for OrderKey is the hierarchy-key values of the entries. Accordingly, the first entry of OrderKey contains as a hierarchy-key value, pathid, and node locator the values '1', '/a', '"', respectively; the second entry contains '1.1', '/a/@c', '3', respectively; the third entry contains '1.2', '/a/b', '11', respectively; the fourth entry contains '1.3', '/a/d', '19', respectively.

Index ReversePath contains an index entry for each node in source XML document A. Each entry of ReversePath includes a reverse pathid and an OrderKey-index reference.

An OrderKey-index reference is a reference to an entry in the index OrderKey. For a given entry of a node in ReversePath, the OrderKey-index reference refers to the entry in OrderKey that corresponds to the node. An OrderKey-index reference may be any kind of reference to a data structure, including memory pointers. However, for purposes of exposition integers representing an entry's ordinal position within OrderKey are used in FIG. 3 to represent OrderKey-index references.

A reverse pathid is the pathid of a node in which the pathid components are in reverse order. For example, the reverse pathid of '/a/b' is 'b/a'. The reverse pathids ReversePath are the index key for ReversePath.

Accordingly, the first entry of ReversePath contains as a reverse pathid and OrderKey-index reference the values 'a/', '1' (representing the first entry in OrderKey), respectively; the second entry contains '@c/a/', and '2', respectively; the third entry contains 'b/a/' and '3', respectively; and the fourth entry contains 'd/a/' and '4', respectively.

According to an embodiment, indexes OrderKey and ReversePath are in-memory b-tree data structures. An in-memory data structure is a data structure stored within the volatile memory of a computer. Volatile memory includes disk-based virtual memory.

Furthermore, indexes OrderKey and ReversPath may index a tree like in-memory representation of XML document A that is generated by the client-tier. The process of generating an in-memory representation of an XML document is referred to herein as materialization. The in-memory representation has a tree-node structure that reflects the hierarchy of the XML document. The in-memory representation often comprises groups or collections of interlinked data structures or objects that individually represent a node and that collectively represent an XML value. For convenience of expression, such data structures are also referred to together as a hierarchy or tree of nodes and individually as a node. According to an embodiment, the locator of OrderKey and ReversePath maybe pointer values to in-memory nodes.

Using Single-Scope Indexes to Perform XPath Operations

With logical index 320, evaluation of XPath expressions can be performed efficiently within the client tier. The XPath expressions that can be evaluated using the index occur in a variety of contexts. XPath expressions evaluated can be embedded in XSLT and XQuery expressions. An application can explicitly present an XPath expression for evaluation. The following are example scenarios of how logical index 320 may be used to evaluate XPath expressions.

Simple Path Expression

Figure 4:
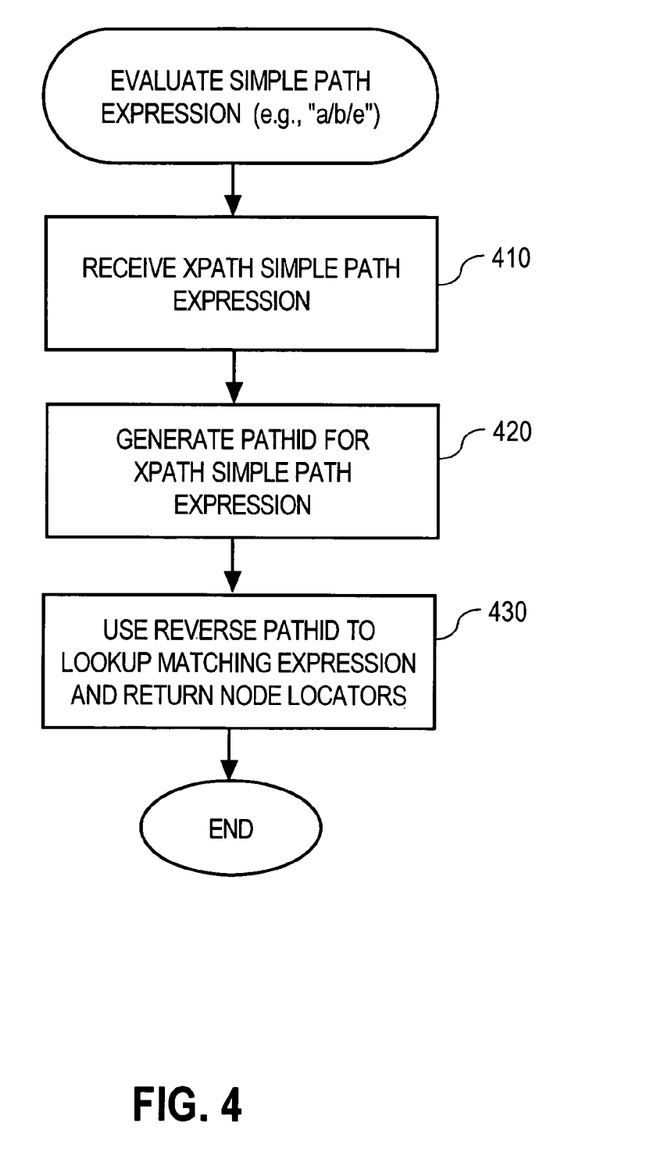
FIG. 4 is a flow chart of a procedure for using a single-scope index according to an embodiment of the present invention.

Simple path expressions are expressions like '/a/b/e' which have no other axis apart from a child axis and which do not have any filters on the axis paths. FIG. 4 shows a procedure for evaluating simple path expressions. The procedure uses index ReversePath. The nodes identified by a simple path expression correspond to the index entries that contain a reverse pathid that completely matches the reverse pathid of the XPath expression.

Referring to FIG. 4, at step 410, the client tier receives the XPath simple path expression. At step 420, the client tier generates a reverse pathid of the XPath Expression.

At step 430, the client tier uses the reverse pathid to lookup ReversePath entries with matching reverse pathids, i.e. whose reverse pathid completely matches the reverse pathid of P. The node locators of the matching entries are returned.

Simple Descendant Expression

Figure 5:
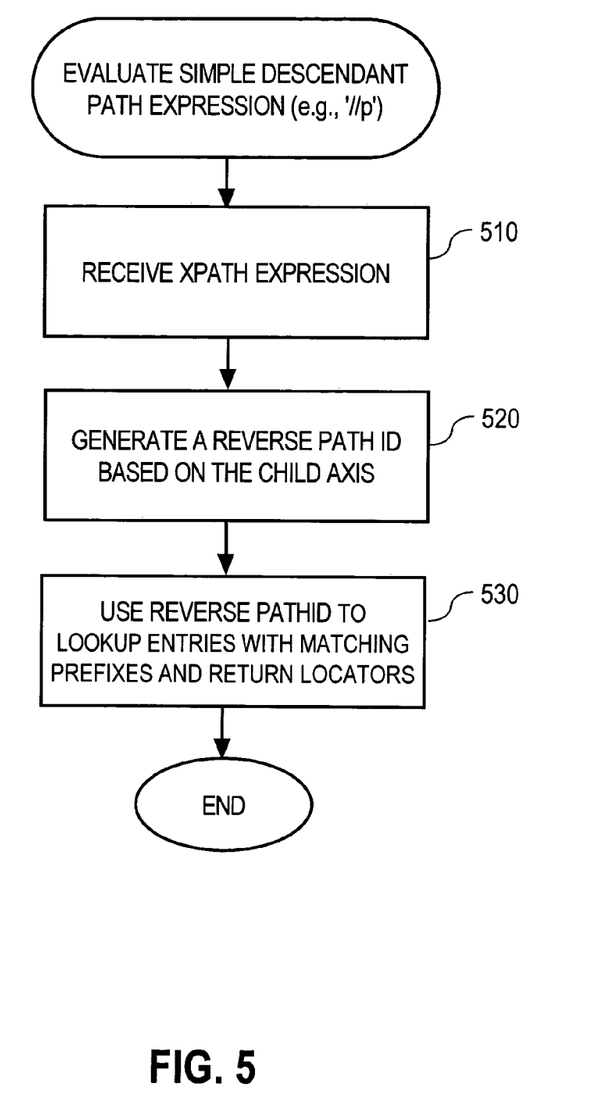
FIG. 5 is a flow chart of a procedure for using a single-scope index according to an embodiment of the present invention.

A simple descendant expression begins by specifying a leading descendant axis followed by a child axis. A simple descendant expression has the form '//P', where P specifies a child axis. FIG. 5 shows a procedure for evaluating the simple descendant path expressions. The procedure uses index ReversePath. The nodes identified by a simple descendant expression correspond to index entries that contain reverse pathid prefixes that match the reverse pathid of P.

Referring to FIG. 5, at step 510, the client tier receives a XPath simple descendant expression. At step 520, the client tier generates a reverse pathid based on the child axis P.

At step 530, the client tier uses the reverse pathid to lookup ReversePath entries with matching prefixes i.e., having a prefix in the reverse pathid that matches the reverse pathid of P. The node locators of the matching entries are returned.

For example, at step 510 the client tier receives XPath expression '//a/b'. The child axis is 'a/b'. At step 520 the client tier generates the reverse pathid of 'b/a'. At step 530, a lookup of entries with prefixes that match 'b/a' yields entries with matching reverse pathids of 'b/a/' and 'b/a/c/b/a/, the pathids of which are '/a/b' and '/a/b/c/a/b'.

An advantage of using reverse pathids as an index key is that this allows ReversePath to be easily used for the types of lookups performed in both the case of a simple path expression and the case of the simple descendant expression. In the case of a simple path expression, the look-up is simply performed by matching an entire reverse pathid to the entire reverse pathids of the index entries. This type of look-up is referred to herein as a full-reverse-path look-up. In the case of a simple descendant expression, the look-up is simply performed by matching the entire reverse pathid of the child axis to the prefixes of reverse pathids of the index entries. This type of look-up is referred to herein as a prefix-reverse-path lookup.

Complex Descendant Expression

Figure 6:
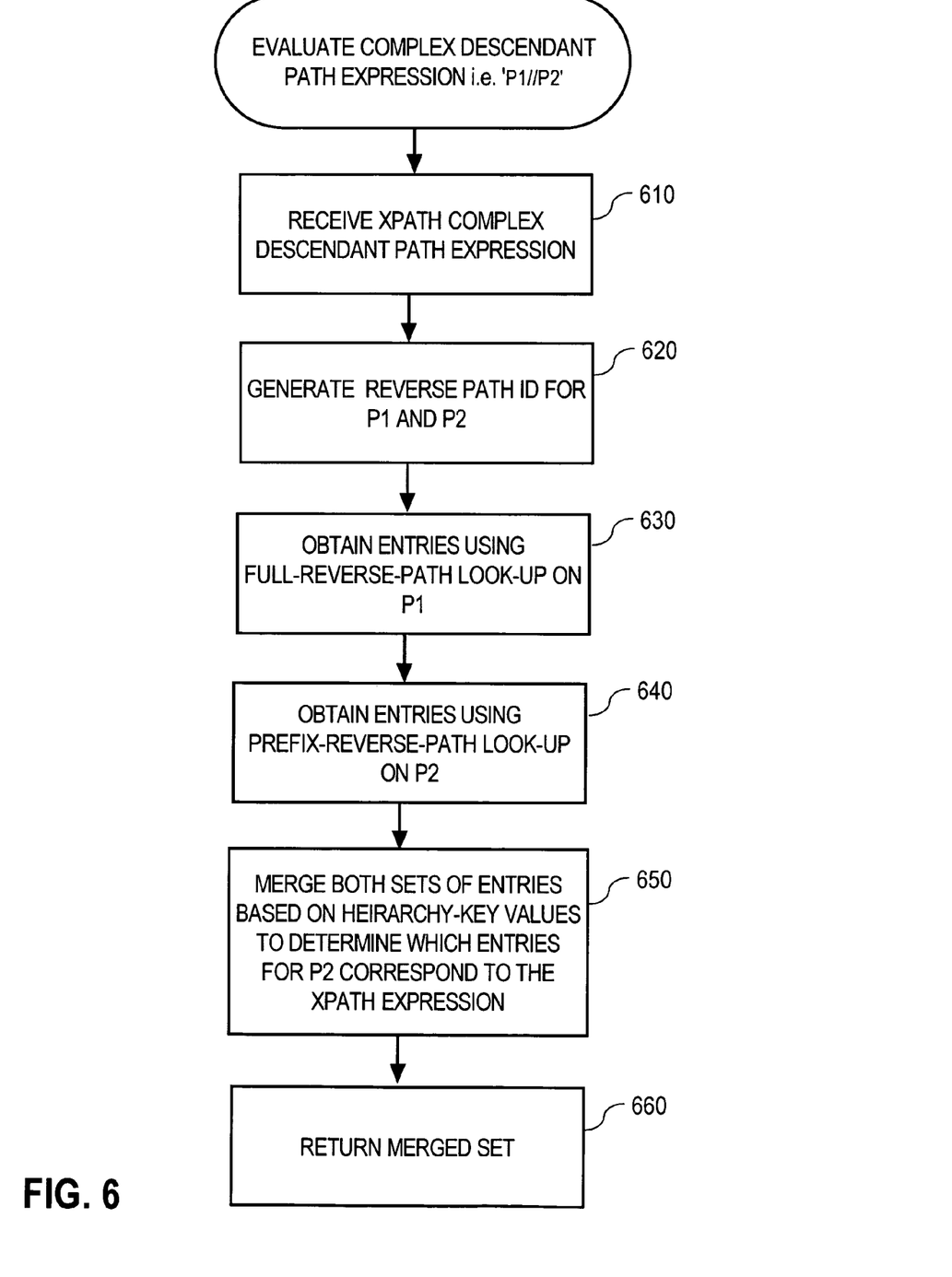
FIG. 6 is a flow chart of a procedure for using a single-scope index according to an embodiment of the present invention.

A complex descendant expression has the form 'P1//P2', where P1 and P2 are both path expressions identifying a child axis. For example, in the complex descendant expression 'a/b//c/d', expression 'a/b' corresponds to P1 and expression 'c/d' corresponds to P2. FIG. 6 shows a procedure used to evaluate a complex descendant expression using Reverse-Path.

Referring to FIG. 6, at step 610, the client tier receives an XPath complex descendant expression. At step 620, the client tier generates a reverse pathid for P1 and a reverse pathid for P2.

At step 630, the client-tier obtains entries ("P1 entries") from ReversePath using a full-reverse-path lookup based on the P1 reverse pathid.

At step 640, the client-tier obtains entries ("P2 entries") from ReversePath using a prefix-reverse-path lookup based on the P2 reverse pathid.

At step 650, both P1 entries and P2 entries are merged based on their respective hierarchy-order key values to generate the entries of nodes that satisfy the XPath complex descendant expression. If the hierarchy-order key value of a P2 entry descends from the hierarchy-order key value of a P1 entry, then the P2 entry satisfies the XPath complex descendant expression, that is, the P2 entry represents a node that satisfies the XPath complex descendant expression. For example, hierarchy-order key values '1.3.2' and '1.3.1.1' descend from hierarchy-order key value '1.3'. Hierarchy-order key value '1.2.1' does not descend from hierarchy-order key value '1.3'.

The hierarchy-order key value of a P1 or P2 entry can be found by using the OrderKey-index reference in the entry to locate and access the corresponding entry in OrderKey that holds the hierarchy-order key value.

At step 660, the ReversePath entries that satisfy the XPath complex descendant expression are returned.

Using Index Entries from Database Tier

When database server 110 receives a request for an XML document, and the document is already indexed by logical index 201 in database server 110, the database server may provide, in addition to the XML document, entries from logical index 201. Client tier 103 may generate single-scope indexes from these entries and avoid much of the previously described processing for generating single-scope indexes during parsing.

Figure 7:
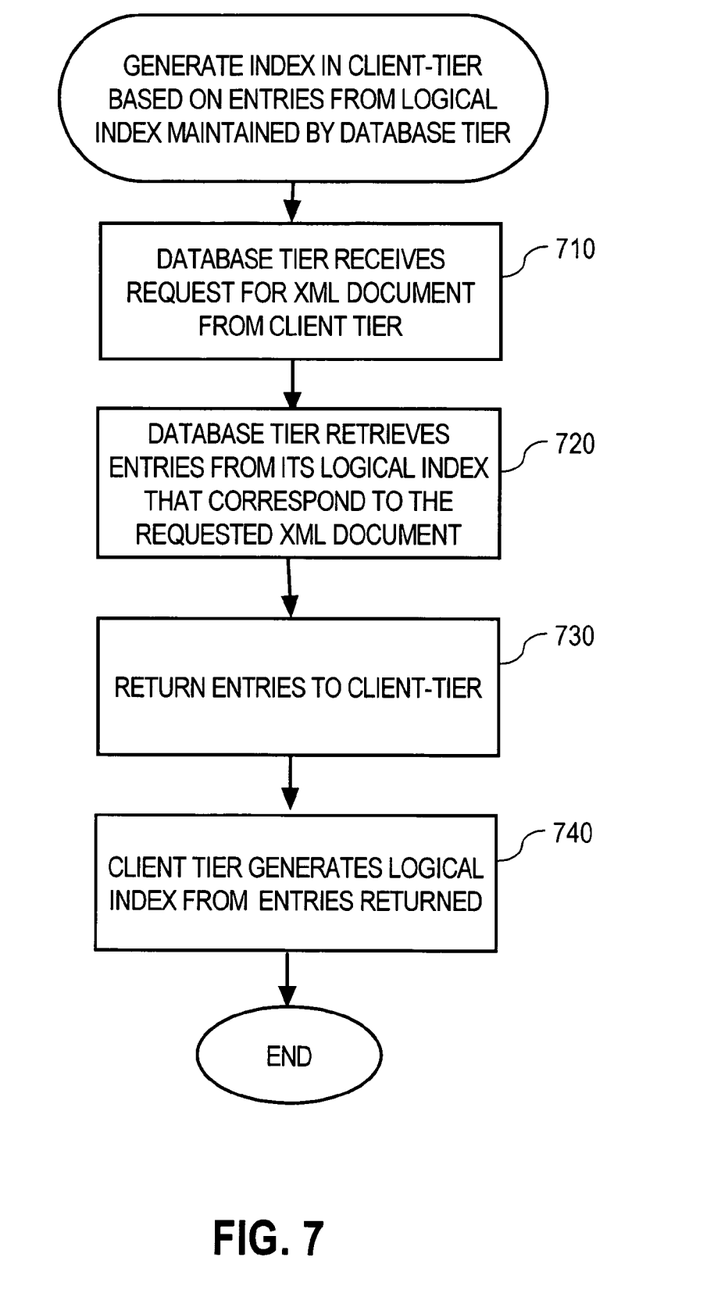
FIG. 7 is a flow chart of a procedure for using a single-scope index according to an embodiment of the present invention.

FIG. 7 shows a procedure that may be followed to generate a logical index in the client tier based on index entries provided by the database tier.

Referring to FIG. 7, at step 710, database tier 102 receives a request for an XML document from client tier 103. At step 720, the database tier retrieves entries from logical index 201 that correspond to the requested XML document. At step 730, database tier 102 returns the retrieved entries to client tier 103.

At step 740, client tier 103 generates logical indexes based on the returned entries. This allows client tier 103 to build the logical index without having to parse the requested XML entries and avoid the concomitant processing.

In an embodiment, the index entries retrieved by the database tier are packaged along with the XML document itself—in the form of a single self-contained unit that is transmitted to the client tier.

In an embodiment, the client tier separately requests the index entries ("index-entry request"), which are fetched from the database tier and transmitted to the client tier. The XML document is transmitted, if at all, in a package separate from the index entries. In this case, the index-entry request includes an identifier that identifies the XML document. The identifier, may be, for example, the row-id of the row storing the XML document.

In an embodiment, the client tier may request a fragment of an XML document. The database tier 102 returns index entries in logical index 201 that correspond to the fragment.

Indexes Enable More Efficient Performance of XML Operations

Single-scope indexes described herein improve the efficiency with which XML operations may be performed. The improved efficiency is achieved in several ways. First, use of the indexes can avoid the need to materialize an XML document in order to perform an XML operation. Even if an XML document is materialized, XML operations such as XPath evaluation can be performed more efficiently by analyzing an index rather than an in-memory representation. Using the materialized XML document to evaluate an XPath operation can require numerous navigation operations to traverse the in-memory data and much more processing than might be needed to examine the indexes.

Hardware Overview

Figure 8:
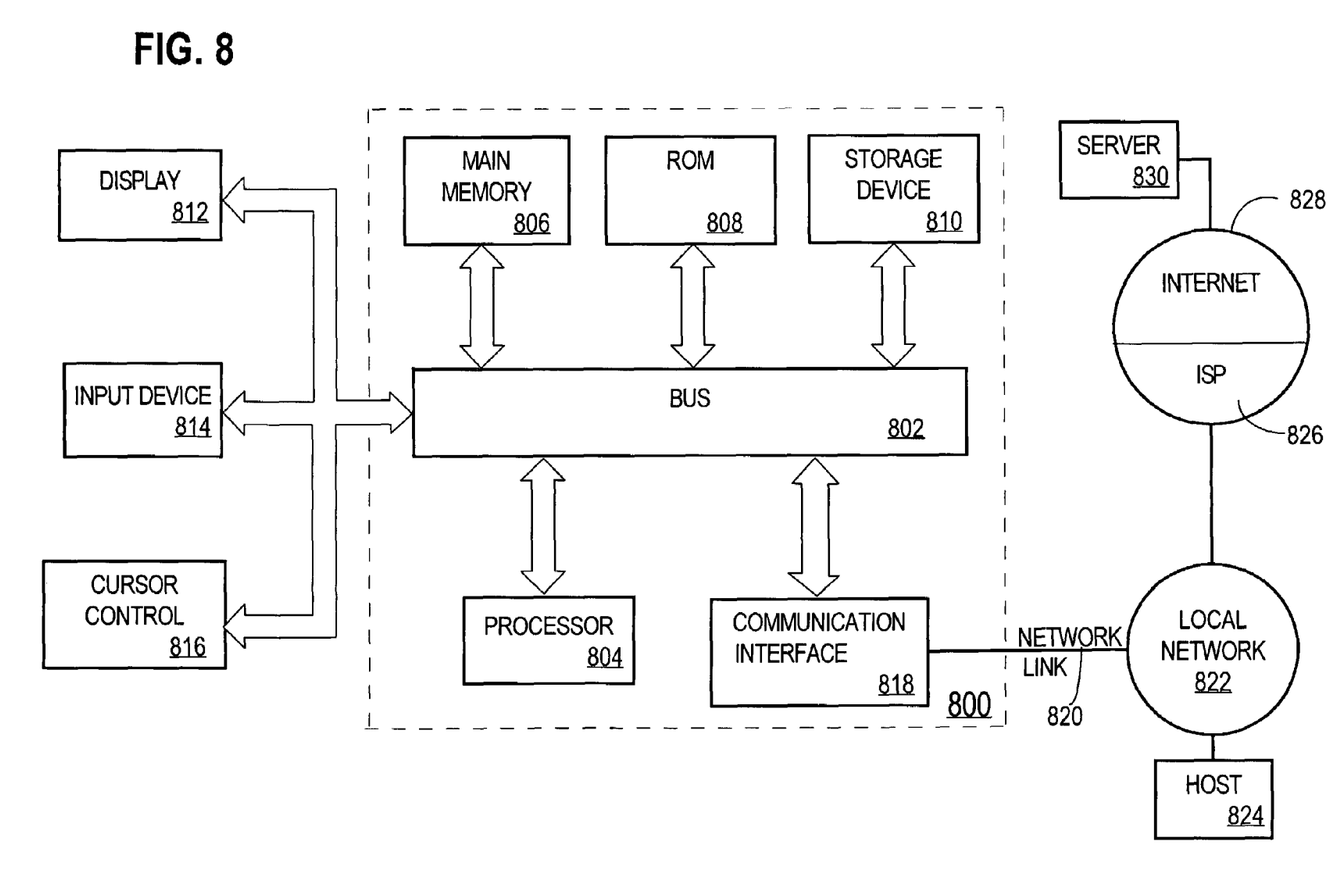
FIG. 8 is a flow chart of a computer system that may be used to implement an embodiment of the present invention.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
a client computer of a server computer in a database tier receiving from the server computer in the database tier, (a) an XML document and (b) index entry data from one or more index entries of a database index maintained by the server computer that indexes a collection of XML document including the XML document;
wherein each of the one or more index entries of the database index corresponds to the one node of the XML document;
wherein the index entry data comprises, for each of the one or more index entries of the database index, a hierarchy-key value, a path identifier, and a locator for the node of the XML document corresponding to the index entry of the database index;
in response to the client computer receiving the XML document and the index entry data from the server computer, the client computer generating, within a volatile or non-volatile memory of the client computer, based on said index entry data from said database index, a single-scope index that indexes one or more nodes of only said XML document;
wherein said single-scope index comprises one or more index entries;
wherein each index entry of the one or more index entries of the single-scope index corresponds to a node of the one or more indexed nodes of the XML document;
wherein generating the single-scope index comprises generating, based on the index entry data, each of the one or more index entries of the single-scope index;
wherein generating each index of the one or more index entries of the single-scope index comprises generating the index entry of the single-scope index based on the hierarchy-key value, the path identifier, and the locator of the index entry data for the node corresponding to the index entry of the single-scope index; and
the client computer performing a query operation involving said XML document using said single-scope index.

2. The computer-implemented method of claim 1, further comprising:
the client computer sending a request regarding the XML document to the server computer; and
in response to the client computer sending the request, the client computer receiving the XML document and the index entry data from the server computer.

3. The computer-implemented method of claim 1, further comprising:
the client computer sending a request regarding the XML document to the server computer;
in response to the client computer sending the request, the client computer receiving the index entry data from the server computer.

4. A non-transitory computer-readable medium storing computer-executable instructions which, when executed by a client computer of a server computer in a database tier, cause the client computer to perform:
a client computer of a server computer in a database tier receiving from the server computer in the database tier, (a) an XML document and (b) index entry data from one or more index entries of a database index maintained by the server computer that indexes a collection of XML documents including the XML document;
wherein each of the one or more index entries of the database index corresponds to one node of the XML document;
wherein the index entry data comprises, for each of the one or more index entries of the database index, a hierarchy-key value, a path identifier, and locator for the node of the XML document corresponding to the index entry of the database index;
in response to the client computer receiving the XML document and the index entry data from the server computer, the client computer generating, within a volatile or non-volatile memory of the client computer, based on said index entry data from said database index, a single-scope index that indexes one or more nodes of only said XML document;
wherein said single-scope index comprises one or more index entries;
wherein each index entry of the one or more index entries of the single-scope index corresponds to a node of the one or more indexed nodes of the XML document;

wherein generating the single-scope index comprises generating, based on the index entry data, each of the one or more index entries of the single-scope index;

wherein generating each index entry of the one or more index entries of the single-scope index comprises generating the index entry of the single-scope index based on the hierarchy-key value, the path identifier, and the locator of the index entry data for the node corresponding to the index entry of the single-scope index; and the client computer performing a query operation involving said XML document using said single-scope index.

5. The non-transitory computer-readable medium of claim 4, further storing computer-executable instructions which, when executed by the client computer, cause:

the client computer sending a request regarding the XML document to the server computer; and in response to the client computer sending the request, the client computer receiving the XML document and the index entry data from the server computer.

6. The non-transitory computer-readable medium of claim 4, further storing computer-executable instructions which, when executed by the client computer cause:

the client computer sending a request regarding the XML document to the server computer; and in response to the client computer sending the request, the client computer receiving the index entry data from the server computer.

* * * * *

UNITED STATES PATENT AND TRADEMARK OFFICE
CERTIFICATE OF CORRECTION

PATENT NO.         : 8,762,410 B2
APPLICATION NO.    : 11/184301
DATED              : June 24, 2014
INVENTOR(S)        : Murthy et al.

Page 1 of 1

It is certified that error appears in the above-identified patent and that said Letters Patent is hereby corrected as shown below:

On the Title Page, References Cited

On page 2, column 2, under Other Publications, line 22, delete "Utils," and insert -- Finding Utils, --, therefor.

In the Claims

Column 12, line 16, Claim 1, delete "index" and insert -- index entry --, therefor.

Column 12, line 53, Claim 4, delete "and" and insert -- and a --, therefor.

Signed and Sealed this
Twenty-fourth Day of February, 2015

Michelle K. Lee
*Deputy Director of the United States Patent and Trademark Office*